United States Patent

Higashimura et al.

Patent Number: 5,484,831
Date of Patent: Jan. 16, 1996

[54] POLYPHENYLENE ETHER RESIN COMPOSITION

[75] Inventors: Hideyuki Higashimura; Yoshitaka Ohbe; Akihiko Okada; Kazutoshi Ohashi, all of Tsukuba; Ryuhei Matsui; Shigeki Kriyama, both of Yokkaichi, all of Japan

[73] Assignees: Sumitomo Chemical Company, Limited, Osaka; Mitsubishi Chemical Corporation, Tokyo, both of Japan

[21] Appl. No.: 383,179

[22] Filed: Feb. 3, 1995

[30] Foreign Application Priority Data

Feb. 3, 1994 [JP] Japan .................... 6-011664
Apr. 13, 1994 [JP] Japan .................... 6-074887

[51] Int. Cl.⁶ .................... C08K 5/17
[52] U.S. Cl. .................... 524/257; 525/390
[58] Field of Search .................... 524/611, 246, 524/257, 206, 260; 525/390; 528/210, 211

[56] References Cited

U.S. PATENT DOCUMENTS

| | | | |
|---|---|---|---|
| 4,092,294 | 5/1978 | Bennett et al. | 260/47 ET |
| 4,335,233 | 6/1982 | Somemiya et al. | 528/211 |
| 4,477,651 | 10/1984 | White et al. | 528/215 |
| 4,868,276 | 9/1989 | Nagaoka et al. | 528/215 |
| 5,043,397 | 8/1991 | Yeager | 525/390 |
| 5,068,310 | 11/1991 | Shaffer | 528/212 |
| 5,191,030 | 3/1993 | Ohmura et al. | 525/390 |
| 5,278,254 | 1/1994 | Furuta et al. | 525/390 |

FOREIGN PATENT DOCUMENTS

| | | |
|---|---|---|
| 63-301222 | 12/1988 | Japan . |
| 91-69946 | 11/1991 | Japan . |
| 4-253725 | 9/1992 | Japan . |
| 5-23291 | 2/1993 | Japan . |
| 5-239323 | 3/1993 | Japan . |
| 6-122762 | 5/1994 | Japan . |
| 6-25525 | 8/1994 | Japan . |

OTHER PUBLICATIONS

D. M. White and S. A. Nye–Macromolecules 23, 1318–1329 (1990).

*Primary Examiner*—Veronica P. Hoke
*Attorney, Agent, or Firm*—Birch, Stewart, Kolasch & Birch

[57] ABSTRACT

A resin composition comprising a polyphenylene ether having, on the average, 0.01 to 10 terminal structures of the formula (1):

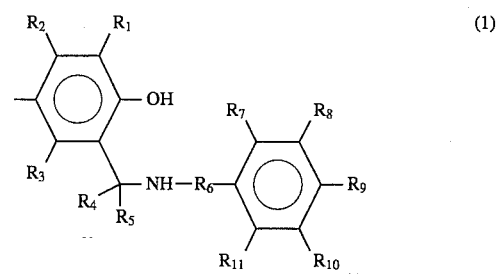

wherein $R_1$ to $R_5$ are each hydrogen, halogen, a substituted or unsubstituted alkyl, alkenyl or alkynyl group, or a substituted or unsubstituted aryl group, $R_6$ is a substituted or unsubstituted alkylene group, and $R_7$ to $R_{11}$ are each hydrogen, halogen, an alkyl group, an alkoxy group, a phenyl group, a phenoxy group, a nitro group or a cyano group per 100 phenylene ether units, and a primary aliphatic monoamine having an aromatic substituent, which composition has good thermal stability.

4 Claims, 1 Drawing Sheet

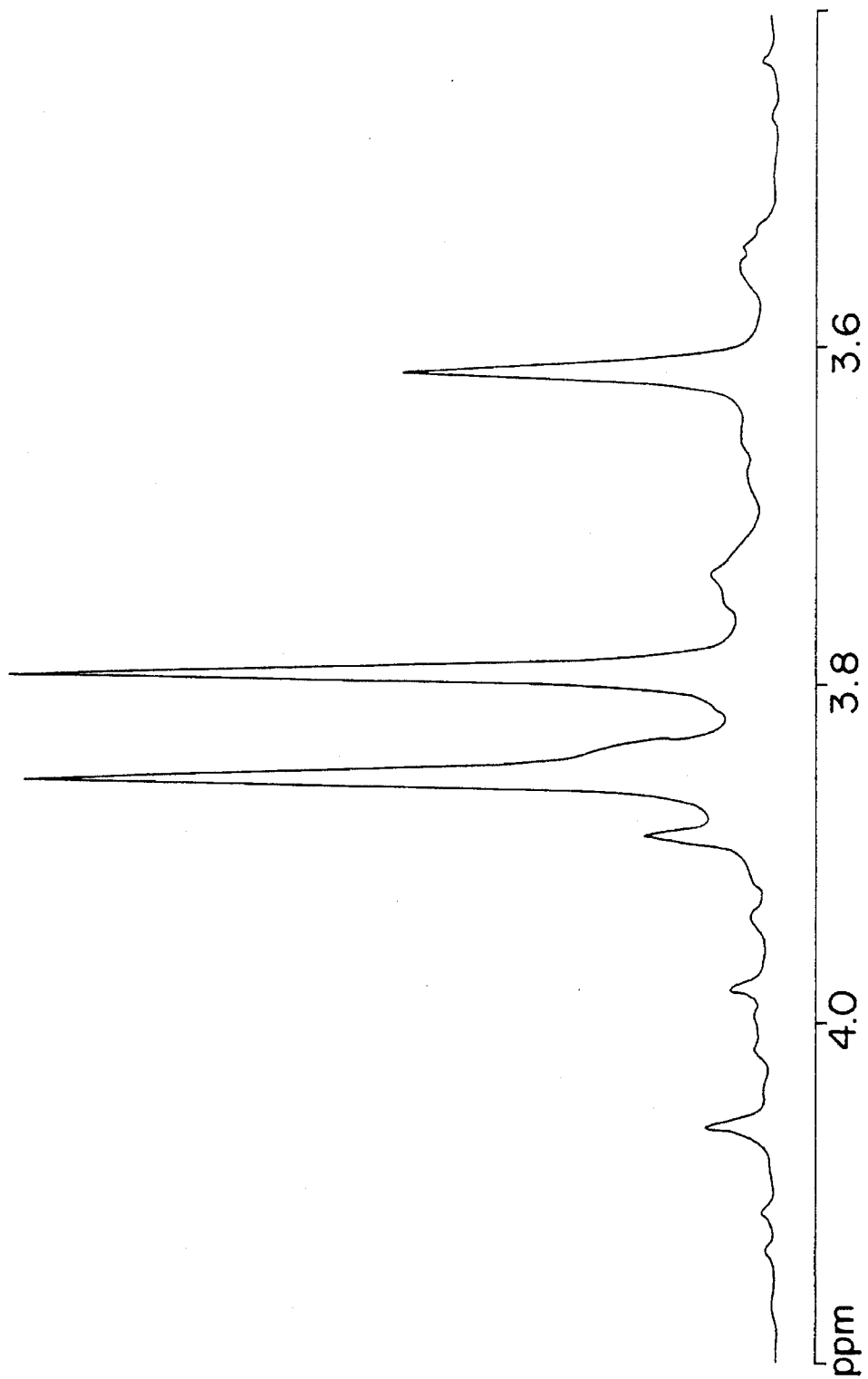
FIGURE

POLYPHENYLENE ETHER RESIN COMPOSITION

BACKGROUND OF THE INVENTION

1. Field of the Invention

The present invention relates to a polyphenylene ether resin composition. In particular, the present invention relates to a resin composition comprising a polyphenylene ether (hereinafter often referred to as "PPE") having a stabilized terminal structure.

2. Description of the Related Art

PPE is one of useful resins. In particular, a polymer alloy of PPE and polystyrene or polyamide is excellent in thermal properties, mechanical properties, electrical properties and so on, and, in these years, increasingly used as a molding material in the automobile, electric and electronic fields and so on.

Hitherto, in a widely known process, PPE is prepared by oxidation polymerizing a nucleus substituted phenol in the presence of a catalyst comprising a complex of manganese, copper, cobalt and the like (cf. Japanese Patent Publication No. 23291/1993 and U.S. Pat. No. 4,092,294).

Macromolecules, 1990, 23, 1318–1329 describes that PPE which is obtained by the polymerization in the presence of a secondary monoamine has a terminal structure of the formula (3):

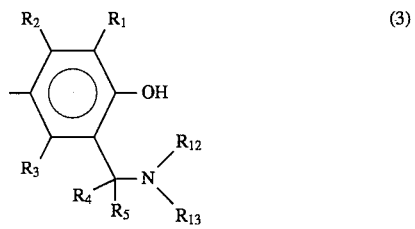

(3)

wherein $R_1$ to $R_5$ represent independently each other a hydrogen atom, a halogen atom, a $C_1$–$C_{20}$ alkyl group, a substituted $C_1$–$C_{20}$ alkyl group, a $C_2$–$C_{20}$ alkenyl group, a substituted $C_2$–$C_{20}$ alkenyl group, a $C_2$–$C_{20}$ alkynyl group, a substituted $C_2$–$C_{20}$ alkynyl group, a $C_6$–$C_{20}$ aryl group or a substituted $C_6$–$C_{20}$ aryl group, and $R_{12}$ and $R_{13}$ represent independently each other a $C_1$–$C_{20}$ alkyl group or a substituted $C_1$–$C_{20}$ alkyl group.

However, PPE having this terminal structure (3) has drawbacks such as coloring and increase of a viscosity in a heating step such as granulation or molding.

Japanese Patent KOKAI Publication No. 253725/1992 discloses that PPE which is obtained by the polymerization in the presence of a primary monoamine has a terminal structure of the formula (4):

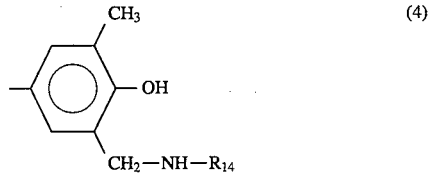

(4)

wherein $R_{14}$ is a lower alkyl group.

However, U.S. Pat. Nos. 4,092,294 and 4,477,651 which the invention of the above Japanese KOKAI publication is based on disclose only an alkylamine as the primary monoamine. Further, U.S. Pat. No. 4,092,294 describes that PPE which is obtained by the polymerization in the absence of the secondary monoamine is heavily colored, and a mixture of such PPE and a styrene resin has deteriorated thermal stability and mechanical properties.

Japanese Patent KOKAI Publication No. 239323/1993 discloses a modified polyphenylene ether prepared by a reaction of PPE and a primary amine. However, this publication describes only an alkylamine as the primary amine, and the modified polyphenylene ether has an insufficient effect to suppress the increase of coloration during heating.

Japanese Patent Publication No. 69946/1991 discloses a resin composition comprising PPE and a primary aromatic amine, which composition suffers from only small decrease of mechanical properties in a high temperature processing, and provides a molded article having good surface gloss. However, the primary aromatic amine comprises an aromatic ring and an amino group which directly bond each other, and cannot suppress an increasing degree of coloration in the heating step such as granulation and molding.

Japanese Patent Publication No. 25525/1994 discloses a resin composition comprising PPE and 0.01 to 5 parts by weight of a primary amine per 100 parts by weight of PPE, which composition has an improved resistance to discoloration by light, and exemplifies a composition comprising 100 parts by weight of PPE and 5 parts by weight of benzylamine as the primary amine. However, the increase of an amount of benzylamine leads to some problems such as decrease of mechanical properties of a molded article, inclusion of bubbles in the molded article, and generation of amine odor during molding. This Japanese Patent Publication does not refer to the increase of coloration in the heating step such as granulation and molding, or suppression of the viscosity increase.

SUMMARY OF THE INVENTION

One object of the present invention is to provide a resin composition comprising PPE which does not generate any amine odor or bubbles during heating in the granulation and molding steps while maintaining mechanical strength of a molded article.

Another further object of the present invention is to provide a resin composition comprising PPE which suffers from very small increase of coloration and very small increase of a viscosity during heating.

According to the present invention, there is provided a resin composition comprising 100 parts by weight of a polyphenylene ether which has, on the average, 0.01 to 10 terminal structures of the formula (1):

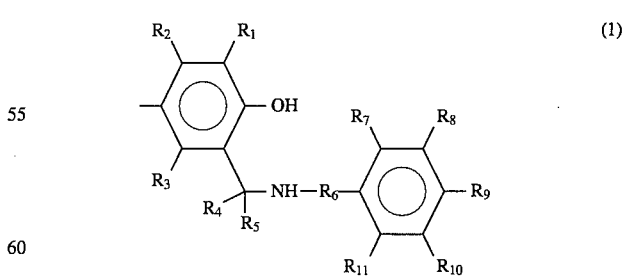

(1)

wherein $R_1$ to $R_5$ represent independently each other a hydrogen atom, a halogen atom, a $C_1$–$C_{20}$ alkyl group, a substituted $C_1$–$C_{20}$ alkyl group, a $C_2$–$C_{20}$ alkenyl group, a substituted $C_2$–$C_{20}$ alkenyl group, a $C_2$–$C_{20}$ alkynyl group, a substituted $C_2$–$C_{20}$ alkynyl group, a $C_6$–$C_{20}$ aryl group or a substituted $C_6$–$C_{20}$ aryl group, $R_6$ is a $C_1$–$C_6$ alkylene group or a substituted $C_1$–$C_6$ alkylene group, and $R_7$ to $R_{11}$ represent independently each other a hydrogen atom, a halogen atom, a $C_1$–$C_6$ alkyl group, a $C_1$–$C_6$ alkoxy group, a phenyl group, a phenoxy group, a nitro group or a cyano group per 100 phenylene ether units, and has a number average polymerization degree of from 10 to 10,000, and 0.01 to 1 part by weight of a primary aliphatic monoamine having an aromatic substituent of the formula (2):

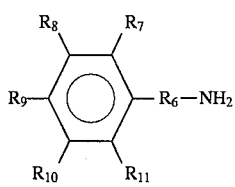

wherein $R_6$ to $R_{11}$ are the same as defined above.

In one preferred embodiment, an amount of the primary aliphatic monoamine of the formula (2) is from 0.01 to 0.6 part by weight per 100 parts by weight of the polyphenylene ether.

In another preferred embodiment, the polyphenylene ether is in the form of powder having an average particle size of 1000 μm or less.

In a further preferred embodiment, a polyphenylene ether resin composition is prepared by adding the primary aliphatic monoamine of the formula (2) to the polyphenylene ether in a step for drying the polyphenylene ether which is prepared by oxidation polymerization of a nucleus substituted phenol and purified, and heating the mixture at a temperature lower than the melting point of the polyphenylene ether.

BRIEF DESCRIPTION OF THE DRAWING

The FIGURE is a $^1$H-NMR spectrum of PPE prepared in Example 1.

DETAILED DESCRIPTION OF THE INVENTION

PPE to be used in the present invention is a polymer comprising the phenylene ether units as repeating units and is not limited except the terminal structure.

A typical example of PPE used in the present invention is a homo- or copolymer comprising at least one kind of 1,4-phenylene ether units of the formula (5):

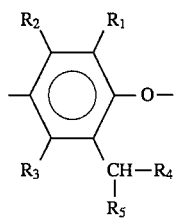

wherein $R_1$ to $R_5$ are the same as defined above, while PPE may comprise 1,4-phenylene ether units of the formula (1) or (3) in which a hydroxyl group (—OH) is changed to an ether linkage (—OH—).

Preferred examples of the 1,4-phenylene ether units are 2,6-dimethyl-1,4-phenylene ether, 2,6-diethyl-1,4-phenylene ether, 2-ethyl-6-methyl-1,4-phenylene ether, 2-methyl-6-(2-octyl)-1,4-phenylene ether, 2-allyl-6-methyl-1,4-phenylene ether, 2-[4-(1-butenyl)]-6-methyl-1,4-phenylene ether, 2-[4-(1-butynyl)]-6-methyl-1,4-phenylene ether, 2-methyl-6-phenyl-1,4-phenylene ether, 2,3,6-trimethyl-1,4-phenylene ether, 3-bromo-2,6-dimethyl-1,4-phenylene ether, and the like. Among them, 2,6-dimethyl-1,4-phenylene ether is more preferred.

In the present invention, PPE has a number average polymerization degree of from 10 to 10,000, preferably from 20 to 2000.

The stabilized terminal structure of PPE according to the present invention is represented by the formula (1).

Preferably, in the formula (1), $R_1$ is a methyl group or a phenyl group; $R_2$ and $R_3$ are both hydrogen atoms, or one of $R_2$ and $R_3$ is a hydrogen atom and the other is a methyl group; $R_4$ and $R_5$ are both hydrogen atoms; $R_6$ is a substituted or unsubstituted $C_1$–$C_6$ alkylene group such as a methylene group, a 1,1-ethylene group, a 1,2-ethylene group, a 1,2-propylene group, a 1,3-propylene group, etc.; $R_7$ to $R_{11}$ represent independently each other a hydrogen atom, a halogen atom, a $C_1$–$C_6$ alkyl group such as a methyl group, an ethyl group, a n-propyl group, etc., a $C_1$–$C_6$ alkoxy group such as a methoxy group, an ethoxy group, a n-propoxy group, etc., a phenyl group, a phenoxy group, a nitro group or a cyano group. More preferably, $R_1$ is a methyl group, $R_2$ to $R_5$ and $R_7$ to $R_{11}$ are all hydrogen atoms, and $R_6$ is a methylene group.

PPE used in the present invention has, on the average, 0.01 to 10, preferably 0.05 to 5 terminal structures of the formula (1) per 100 phenylene ether units.

In addition to the terminal structure of the formula (1), PPE to be used in the present invention may have partly the terminal structure of the formula (3) or a terminal structure corresponding to the structure of the formula (5) in which the ether linkage is changed to a hydroxy group. Specific examples of such additional structures are the terminal structure of the formula (3) in which $R_1$ is a methyl group or a phenyl group; $R_2$ and $R_3$ are both hydrogen atoms or one of $R_2$ and $R_3$ is a hydrogen atom and the other is a methyl group; $R_4$ and $R_5$ are both hydrogen atoms; and $R_{12}$ and $R_{13}$ are independently a methyl group or a n-butyl group, and the terminal structure of the formula (5) in which $R_1$ is a methyl group or a phenyl group; one of $R_2$ and $R_3$ is a hydrogen atom and the other is a methyl group; and $R_4$ and $R_5$ are both hydrogen atoms. Among them, the terminal structure of the formula (3) in which $R_1$ is a methyl group, $R_2$ to $R_5$ are all hydrogen atoms and $R_{12}$ and $R_{13}$ are both n-butyl groups, and the terminal structure of the formula (5) in which $R_1$ is a methyl group and $R_2$ to $R_5$ are all hydrogen atoms are preferred.

The primary aliphatic monoamine having an aromatic substituent is represented by the above formula (2).

In the formula (2), preferably, $R_6$ is a substituted or unsubstituted $C_1$–$C_6$ alkylene group such as an 1,1-ethylene group, a 1,2-ethylene group, a 1,2-propylene group, a 1,3-propylene group, etc.; and $R_7$ to $R_{11}$ represent independently each other a hydrogen atom, a halogen atom, a $C_1$–$C_6$ alkyl group such as a methyl group, an ethyl group, a n-propyl group, etc., a $C_1$–$C_6$ alkoxy group such as a methoxy group, an ethoxy group, a n-propoxy group, etc., a phenyl group, a phenoxy group, a nitro group or a cyano group.

Specific examples of the primary aliphatic monoamine of the formula (2) are benzylamine, o-, m- or p-chlorobenzylamine, o-, m- or p-methylbenzylamine, o-, m- or p-methoxybenzylamine, o-, m- or p-phenylbenzylamine, o-, m- or p-phenoxybenzylamine, o-, m- or p-nitrobenzylamine, α- or β-phenylethylamine, α-, β- or γ-phenyl-1-propylamine, α-, β-, γ- or δ-phenyl-1-butylamine, and the like. Among them, benzylamine is more preferred.

The PPE resin composition of the present invention comprises 100 parts by weight of PPE which has, on the average, 0.01 to 10, preferably 0.05 to 5 terminal structures of the formula (1) per 100 phenylene ether units, and has a number average polymerization degree of from 10 to 10,000, and 0.01 to 1 part by weight, preferably 0.01 to 0.6 part by weight of the primary aliphatic monoamine having an aromatic substituent of the formula (2) in a free state that the amine is not bonded to the polymer chain.

When an amount of the free primary aliphatic monoamine having the aromatic substituent is less than 0.01 part by weight, the increase of coloration and viscosity is unpreferably large when the composition is heated. When an amount of the free primary aliphatic monoamine having the aromatic substituent is larger than 1 part by weight, some problems that the mechanical strength of the molded article is deteriorated, the amine is liberated during molding and the bubbles are contained in the molded article and so on, unpreferably arise.

There is no specific limitation on a preparation method of the PPE resin composition of the present invention. In a typical method, to 100 parts by weight of PPE which has, on the average, 0.01 to 10, preferably 0.05 to 5 terminal structures of the formula (3) per 100 phenylene ether units, and a number average molecular weight of from 10 to 10,000, the primary aliphatic monoamine having an aromatic substituent of the formula (2) is added in an amount of $[0.55 \times (XY/Z)+0.01]$ part by weight to $[1.7 \times (XY/Z)+1]$ parts by weight, preferably $[0.55 \times (XY/Z)+0.01]$ part by weight to $[1.7 \times (XY/Z)+0.6]$ parts by weight (wherein X is the number of the terminal structures of the formula (3) per 100 phenylene ether units; Y is a molecular weight of the primary aliphatic monoamine having the aromatic substituent of the formula (2); and Z is a chemical formula weight of the phenylene ether unit in PPE, and then a mixture is heated.

PPE to be used in the present invention may be prepared by any of per se conventional methods. For example, a nucleus substituted phenol is oxidation polymerized in the presence of a catalyst comprising a secondary monoamine and a complex of a transition metal such as manganese, copper, cobalt, and the like, as disclosed in Japanese Patent Publication No. 23291/1993 and U.S. Pat. No. 4,092,294.

A temperature for heating the mixture of PPE and the primary aliphatic monoamine having the aromatic substituent is preferably from 100° to 320° C., more preferably from 120° to 300° C.

In a specific preparation method, PPE and the primary aliphatic monoamine having the aromatic substituent are mixed and melt kneaded using a conventional kneading apparatus such as a Banbury mixer, a roll, a kneader, an extruder and so on, or hot pressed by a hot press machine. Alternatively, the primary aliphatic monoamine having the aromatic substituent is added to PPE in a drying step in the production process of PPE, and then the mixture is heated and stirred. This method is slightly better than the other preparation methods since PPE and the primary aliphatic monoamine are homogeneously treated in a large scale in the production process of PPE. This method will be explained hereinafter.

A drying apparatus to be used is not limited, and any of conventionally used driers such as a fluid drier, a rotary drier, a multi-fin drier and the like may be used.

A temperature in a step for adding the primary aliphatic monoamine having the aromatic substituent to PPE and heating the mixture is lower than a melting point of PPE, preferably from 100 to 170° C. in view of a drying efficiency.

A drying and mixing time is preferably from 0.5 to 10 hours. The mixing manner of PPE and the primary aliphatic monoamine may be a batchwise method or a continuous method.

PPE to be supplied to the drying step is not limited insofar as it is powdered after purification of a polymerization reaction mixture. For example, when the polymerization reaction mixture is in a solution form, it is treated with water containing a purifying agent such as a chelating agent (e.g. EDTA, etc.) and/or a reducing agent (e.g. sodium pyrophosphate, sodium pyrosulfite, sodium hydrosulfite, etc.), and the mixture is liquid-liquid separated. Then, PPE in an organic phase is precipitated with a poor solvent such as methanol, and PPE powder is collected by solid-liquid separation. Alternatively, PPE is precipitated from the polymerization liquid in a poor solvent such as methanol, and collected by solid-liquid separation.

Since the obtained PPE powder contains an aromatic hydrocarbon such as benzene, toluene or xylene and an alcohol such as methanol, or water, it is supplied to the drying step to remove such solvent.

Preferably, the PPE powder has an average particle size of 1000 μm or less.

In the drying step, in addition to the removal of the solvent, PPE is contacted to the primary aliphatic monoamine having the aromatic substituent. The primary aliphatic monoamine having the aromatic substituent may be mixed in wet PPE powder, or it may be directly supplied in the drier. When it is directly supplied in the drier, it can be supplied in the form of a liquid, a spray or a vapor.

PREFERRED EMBODIMENTS OF THE INVENTION

The present invention will be illustrated by the following Examples, which do not limit the scope of the present invention in any way.

In the following Examples, a PPE composition was molded by charging the powdery PPE composition in a mold having a cavity of 1 mm in thickness and press molding the composition at 250° C. for 10 minutes under pressure of 10 to 100 kg/cm$^2$.

As a criterion of a coloring degree of the PPE composition, an absorbance at a wavelength of 340 nm (hereinafter referred to as "ABS$_{340}$") was used, which was measured with a chloroform solution dissolving the composition powder or a piece of a press molded sheet at a concentration of 0.25 g/dl by a spectrophotometer (U-3500 type manufactured by Hitachi Limited) using a quartz cell with a light path length of 10 mm.

An increased degree of coloring after heating of the PPE composition was expressed by a difference between ABS$_{340}$ of the press molded sheet and that of the composition powder ($\Delta$ABS$_{340}$).

As a viscosity of the PPE composition, there was used a reduced viscosity ($\eta_{sp}/c$) measured with a chloroform dissolving the powder or the piece of the press molded sheet at a concentration of 0.5 g/dl at 25° C.

An increased amount of viscosity after heating of the PPE composition was expressed by a difference between the reduced viscosity of the press molded sheet and that of the powder ($\Delta\eta_{sp}/c$).

A flexural strength of the press molded article is measured with a specimen of the press molded sheet having a length of 35 mm, a width of 11 mm and a thickness of 1 mm using Autograph AG 5000 D (manufactured by Shimadzu Corporation).

The number of bubbles having a diameter of 1 mm or larger in an area of 35 mm×35 mm of the press molded article was counted by eyes.

A molecular weight of PPE was measured by gel permeation chromatography using RI-8011 (Manufactured by Toso) as a detector and converted to a molecular weight of the standard polystyrene.

An amount of the free amine which was not bonded to the polymer in the PPE resin composition was measured by gas chromatography (HP-5890 A manufactured by Hewlett-Packard) using a nitrogen-phosphorus detector (NPD).

The terminal structure of PPE was determined and quantitatively analyzed by the measurement of a nuclear magnetic resonance (NMR) spectrum on a sample of PPE which had been reprecipitated to remove the free amine.

The reprecipitation of PPE was carried out by dissolving. PPE (2 g) was dissolved in chloroform (40 ml), pouring the obtained solution in methanol (160 ml), collecting the precipitated polymer by filtration, washing the collected polymer with methanol twice (each 20 ml) and drying it at 100° C. for 3 hours under reduced pressure.

As the NMR spectra, a $^1$H-NMR spectrum, a HMQC spectrum (see J. Am. Chem. Soc., 1986, 108, 4285) and a HMBC spectrum (see J. Am. Chem. Soc., 1986, 108, 2093) were measured using AMX 600 (manufactured by Brucker).

EXAMPLE 1

In a jacketed 100 liter autoclave equipped with a stirrer, a thermometer, a condenser and an air-inlet tube, xylene (35.7 kg), methanol (12.2 kg), 2,6-dimethylphenol (12.2 kg, 100 moles) and sodium hydroxide (320 g, 8 moles) were charged to form a homogeneous solution. To the solution, a solution of monoethanolamine (220 g, 3.6 moles), dibutylamine (129 g, 1 mole) and manganese chloride tetrahydrate (8.9 g, 0.045 mole) in methanol (1000 g) was added. Then, an air was blown in the mixture which was vigorously stirred, at a flow rate of 10 liter/min. for 10 hours at 40° C. under 9 kg/cm$^2$ to react the raw materials. The reaction temperature was maintained at 30° C. after 7.5 hours from the start of air blowing. The polymerization reaction mixture was in the form of a viscous solution.

To the reaction mixture, methanol (22.5 kg) was added to obtain a slurry, and the slurry was filtrated using a vacuum filter, and a filter cake was washed with methanol and again filtrated in the same way to obtain a wet cake.

The wet cake was charged in a 100 liter stirring tank equipped with a stirrer, a thermometer, a condenser and a steam inlet pipe at a bottom and treated with water (48 liters), sodium pyrophosphate decahydrate (147 g, 0.33 moles) and sodium pyrosulfite (196 g,1.03 moles) at 70° C. for 1 hour while stirring. Thereafter, steam was blown in the tank at a flow rate of 3 kg/hr. for 8 hours to remove the solvent.

Then, a dispersion was recovered from the tank and solid-liquid separated by a basket type centrifugal separator to obtain a polymer.

The polymer was washed with water (48 liters) at 70° C. for 30 minutes, and then solid-liquid separated by the basket type centrifugal separator to obtain a wet PPE powder.

The wet PPE powder was charged in a jacketed 40 liter fluid tank having a perforated plate at a bottom and dried by blowing a nitrogen gas at a rate of 175 Nm$^3$/hr. at 120° C. for 3 hours to obtain a PPE powder (11.5 kg) having a number average molecular weight of 12,400 and a number average polymerization degree of 103.

From the $^1$H-NMR spectrum of a sample of the PPE powder which had been reprecipitated, it was found that PPE had, on the average, one terminal structure of the following formula (7), which was identified in Macromolecules, 1990, 23, 1318–1329, per 100 2,6-dimethyl-1,4-phenylene ether units:

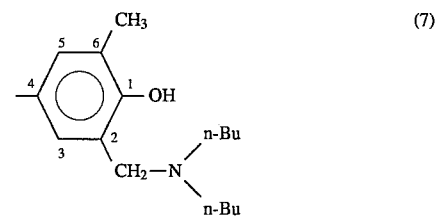

The PPE powder (8.0 g) and benzyl amine (160 mg, 2 parts by weight per 100 parts by weight of the PPE powder) which was dissolved in methanol were mixed and stirred at room temperature for 1 hour. After removing methanol by drying under reduced pressure, the mixture was press molded at 250° C. No amine odor was smelled.

From a NMR spectrum of a sample which was obtained by reprecipitating the press molded article, it was found PPE had, on the average, 0.6 terminal structure of the following formula (6) per 100 2,6-dimethyl-1,4-phenylene ether units:

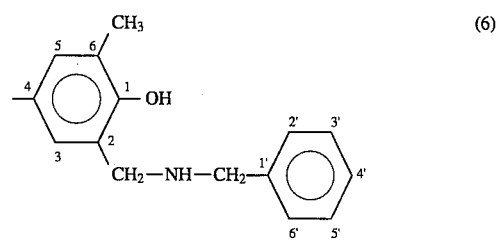

In the $^1$H-NMR spectrum of this sample which is shown in the FIGURE, main peaks indicating the 2,6-dimethyl-1, 4-phenylene repeating units appeared at 2.10 ppm and 6.48 ppm. In addition, two peaks appeared at 3.80 ppm and 3.88 ppm, which did not appear in the $^1$H-NMR spectrum of the PPE sample containing, no benzylamine prepared in Comparative Example 1. From the HMQC and HMBC spectra, these additional two peaks were assigned to the protons of the methylene group bonded at the 1'-position of the structure (6) and the protons of the methylene group bonded at the 2-position, respectively.

The structure (6) being the terminal structure was confirmed by the finding that the chemical shifts of the structure (6) well coincided with those of the formula (7) since the proton peak appeared at 3.88 ppm, the chemical shifts of $^{13}$C at the 1-, 2- and 3-positions were 150.4 ppm, 122.3 ppm and 111.7 ppm, respectively.

The number of the terminal structures was calculated from an area ratio of the peak at 3.80 ppm of the protons of the methylene group bonded at the 1'-position to the peak at 6.48 ppm of the protons at the 3- and 5-positions of the 2,6-dimethyl-1,4-phenylene unit.

PPE in the press molded article had a number average molecular weight of 13,000 and a number average polymerization degree of 108, and an amount of free benzylamine was 0.50% by weight.

The properties of the molded article are shown in the Table.

EXAMPLES 2–5 and Comparative Examples 1–6

In the same manner as in Example 1 except that an amount of benzylamine was changed as shown in the Table, a molded article of a PPE composition was produced. The properties of the molded article are shown in the Table.

TABLE

| | | | | | | | | Press molded article | | |
|---|---|---|---|---|---|---|---|---|---|---|
| Example No. | Benzylamine (weight parts) | No. Av. Molecular weight | Terminal structure (6) *a) | Amount of free benzylamine (wt. %) | $\Delta ABS_{340}$ | $\Delta\eta_{sp}/c$ (dl/g) | Flexural strength (kgf/cm$^2$) | No. of bubbles (larger than 1 mm$\Phi$) | Amine odor during molding |
| Ex. 1 | 2.0 | 13000 | 0.6 | 0.50 | 0.02 | 0.01 | 1240 | 1 | No |
| Ex. 2 | 0.6 | 15900 | 0.3 | 0.03 | 0.04 | 0.04 | 1160 | 0 | No |
| Ex. 3 | 0.8 | 15900 | *b) | 0.07 | 0.04 | 0.04 | 1180 | 0 | No |
| Ex. 4 | 1.0 | 14200 | 0.3 | 0.10 | 0.03 | 0.02 | 1230 | 1 | No |
| Ex. 5 | 1.5 | 13700 | 0.4 | 0.21 | 0.02 | 0.01 | 1220 | 0 | No |
| C. Ex. 1 | — | 18000 | <0.01 | <0.01 | 0.08 | 0.07 | 1200 | 0 | No |
| C. Ex. 2 | 0.1 | 18000 | *b) | <0.01 | 0.08 | 0.08 | 1240 | 0 | No |
| C. Ex. 3 | 0.2 | 18000 | *b) | <0.01 | 0.08 | 0.08 | 1220 | 0 | No |
| C. Ex. 4 | 0.4 | 18000 | 0.1 | <0.01 | 0.07 | 0.07 | 1230 | 0 | No |
| C. Ex. 5 | 3.0 | 13000 | 0.7 | 1.12 | 0.01 | −0.01 | 1090 | 7 | Yes |
| C. Ex. 6 | 5.0 | 13000 | 0.9 | 1.30 | 0.00 | −0.01 | 1090 | 11 | Yes |

Note:
*a) The number of the terminal structures (6) per 100 phenylene ether units.
*b) Not measured.

EXAMPLE 6

In the same manner as in Example 1 till the solid-liquid separation by the basket type centrifugal separator, a wet PPE powder was obtained.

To the wet PPE powder, benzylamine (89 g, 0.8 part by weight per 100 parts by weight of PPE) was added and mixed.

The mixture was charged in a jacketed 40 liter fluid tank having a perforated plate at a bottom and dried by blowing a nitrogen gas at a rate of 175 Nm$^3$/hr. at 120° C. for 3 hours to obtain a PPE composition powder (11.5 kg) having an average particle size of 300 μm. A number average molecular weight of PPE was 13,500 (corresponding to a number average polymerization degree of 112).

From the $^1$H-NMR spectrum of a sample of the PPE powder which had been reprecipitated, it was found that PPE had, on the average, 0.1 terminal structure of the formula (6) per 100 2,6-dimethyl-1,4-phenylene ether units.

An amount of free benzylamine in the PPE powder was 0.02% by weight.

PPE had $\Delta ABS_{340}$ of 0.03 and $\Delta\eta_{sp}/c$ of 0.04 dl/g.

The molded article had the flexural strength of 1200 kg/cm$^2$, no bubbles of a diameter of 1 mm or larger, and no amine odor.

Comparative Example 7

In the same manner as in Example 1 except that aniline, in which an amino group was bonded directly to an aromatic ring, was used in place of benzylamine, a press molded article of a PPE composition was produced.

The press molded article had $\Delta ABS_{340}$ of 0.11. The addition of the primary aromatic amine further increased the degree of coloration during heating.

What is claimed is:

1. A resin composition comprising 100 parts by weight of a polyphenylene ether which has, on the average, 0.01 to 10 terminal structures of the formula (1):

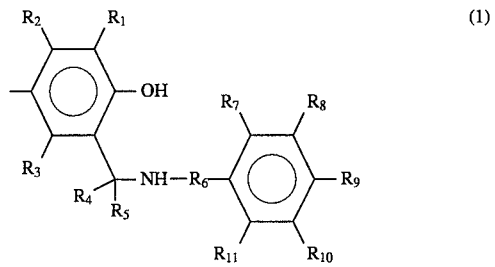

(1)

wherein $R_1$ to $R_5$ represent independently each other a hydrogen atom, a halogen atom, a $C_1$–$C_{20}$ alkyl group, a substituted $C_1$–$C_{20}$ alkyl group, a $C_2$–$C_{20}$ alkenyl group, a substituted $C_2$–$C_{20}$ alkenyl group, a $C_2$–$C_{20}$ alkynyl group, a substituted $C_2$–$C_{20}$ alkynyl group, a $C_6$–$C_{20}$ aryl group or a substituted $C_6$–$C_{20}$ aryl group, $R_6$ is a $C_1$–$C_6$ alkylene group or a substituted $C_1$–$C_6$ alkylene group, and $R_7$ to $R_{11}$ represent independently each other a hydrogen atom, a halogen atom, a $C_1$–$C_6$ alkyl group, a $C_1$–$C_6$ alkoxy group, a phenyl group, a phenoxy group, a nitro group or a cyano group per 100 phenylene ether units, and has a number average polymerization degree of from 10 to 10,000, and 0.01 to 1 part by weight of a primary aliphatic monoamine having an aromatic substituent of the formula (2):

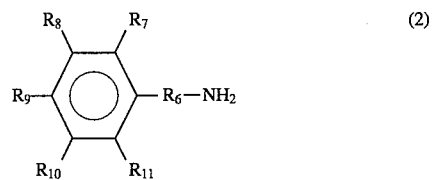

(2)

wherein $R_6$ to $R_{11}$ are the same as defined above.

2. The resin composition according to claim 1, wherein an amount of said primary aliphatic monoamine of the formula (2) is from 0.01 to 0.6 part by weight per 100 parts by weight of said polyphenylene ether.

3. The resin composition according to claim 1, wherein said polyphenylene ether is in the form of powder having an average particle size of 1000 μm or less.

4. The resin composition according to claim 3, which is prepared by adding said primary aliphatic monoamine of the formula (2) to said polyphenylene ether in a step for drying said polyphenylene ether which is prepared by oxidation polymerization of a nucleus substituted phenol and purified, and heating the mixture at a temperature lower than a melting point of said polyphenylene ether.

* * * * *